Aug. 24, 1954   D. C. GERBER ET AL   2,687,284
FOOD MIXER

Filed May 21, 1952   4 Sheets-Sheet 1

INVENTORS.
D. C. Gerber, E. R. Swann
BY and W. G. Seck
Richard P. Fitzsimmons
ATTORNEY.

INVENTORS.
D.C. Gerber, E.R. Swann
BY and W.G. Seck
ATTORNEY.

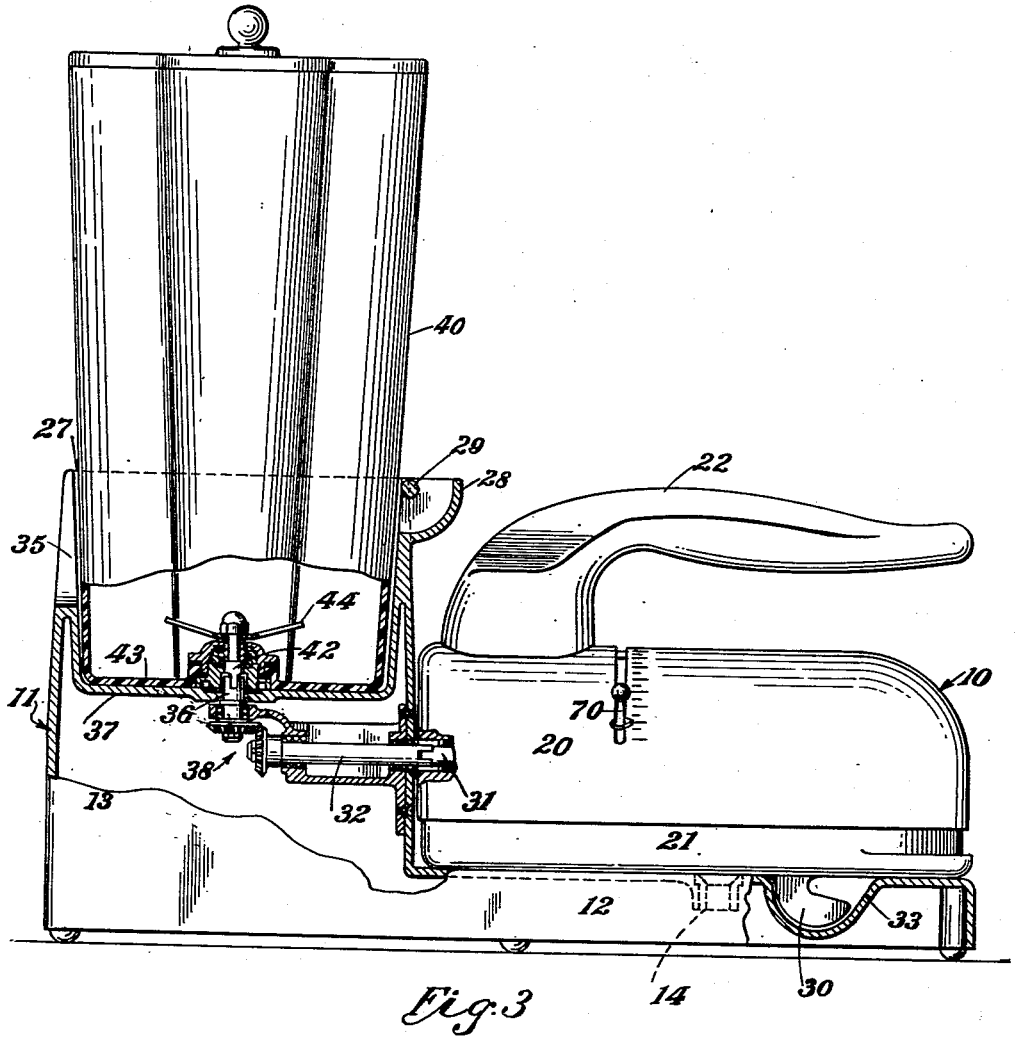

Aug. 24, 1954   D. C. GERBER ET AL   2,687,284
FOOD MIXER
Filed May 21, 1952   4 Sheets-Sheet 4
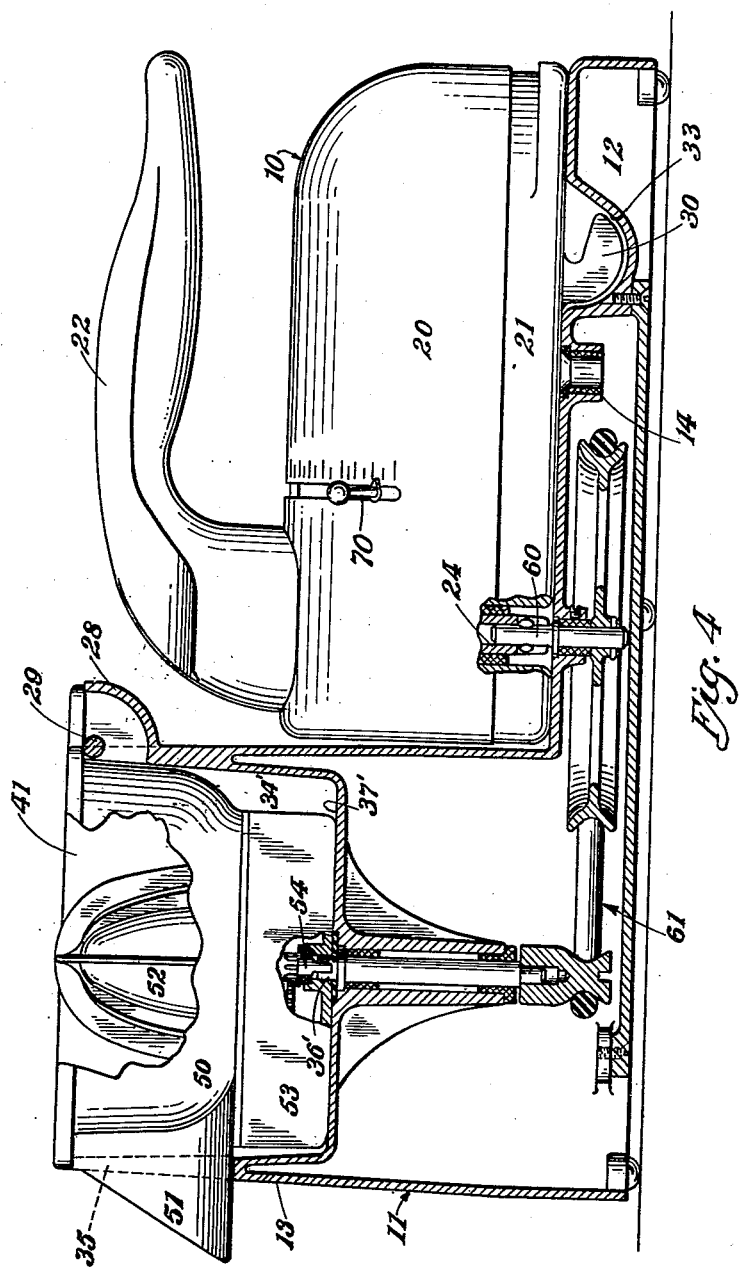
INVENTORS.
D.C. Gerber, E.R. Swann
BY and W.G. Seck
Richard P. Fitzsimmons
ATTORNEY.

Patented Aug. 24, 1954

2,687,284

UNITED STATES PATENT OFFICE 2,687,284

FOOD MIXER

Dale C. Gerber and Edward R. Swann, North Canton, and Werner G. Seck, Canton, Ohio, assignors to The Hoover Company, North Canton, Ohio, a corporation of Ohio Application May 21, 1952, Serial No. 289,174

8 Claims. (Cl. 259—104)

1

The present invention relates to food mixers and more particularly to an arrangement in which a plurality of utensils may be driven from a single portable power unit.

According to the present invention an L-shaped supporting base is provided in the form of vertically and horizontally extending legs forming reentrant right angled walls. The vertical leg forms a standard for supporting a portable power unit and the horizontal leg a support for a rotatable mixing bowl when the device is used for ordinary mixing operation. The horizontal leg also forms a support for the power unit for storage purposes and when the device is used for driving other utensils.

A receptacle is formed in the top of the supporting standard for receiving a variety of power driven utensils. A rotatable shaft extends upwardly through the bottom wall of the receptacle for detachable and driving engagement with the shafts of the various utensils. A second rotatable shaft extends through one or the other of reentrant walls for detachable and driving engagement with a power takeoff shaft of the power unit when it is supported on the horizontal leg. The two shafts are drivingly connected by a suitable power transmission.

The device of the present invention is of particular utility in modern homes and apartments where the heighth of the space above the work surface of kitchen cabinets is very narrow. In such instances the power unit is merely removed from the supporting standard and placed on the horizontal leg of the base which reduces the total heighth of the device to substantially that of the supporting standard.

Other objects and advantages of the invention will become apparent as the description proceeds when taken in connection with the accompanying drawings in which:

Figure 3 is a vertical plan view partly broken away showing another mode of operating the mixer of the present invention; and Figure 4 is a vertical plan view of the mixer of the present invention showing a third mode of operation and partly broken away to show the details of a modified power transmission between the power unit and the auxiliary utensils.

Figure 1:
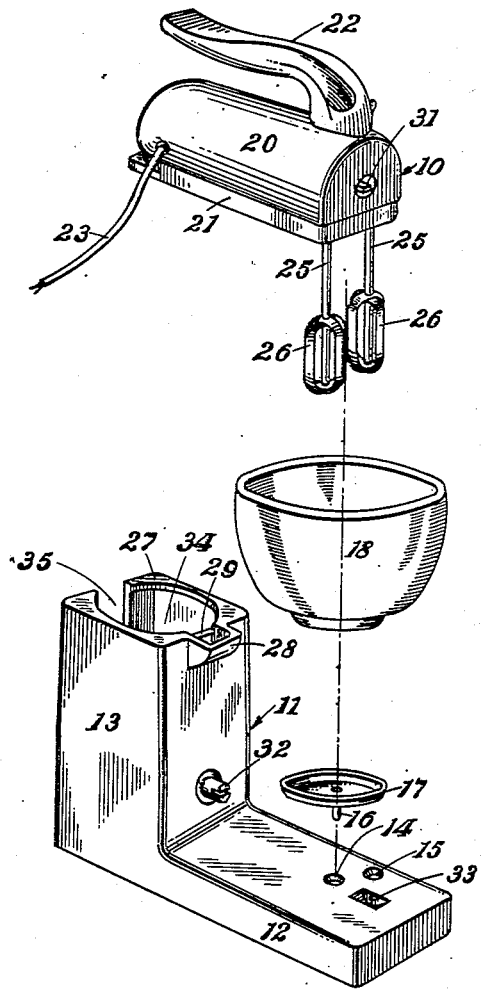
Figure 1 is an exploded perspective view of a mixer according to the present invention.

Referring to the drawings, the reference numeral 10 represents generally the power unit of

2 the present invention and the reference numeral 11 represents generally the supporting base for the power unit and the various utensils. The support 11 is L-shaped in form and includes a horizontal supporting leg 12 and a vertically extending leg or standard 13. The legs 12 and 13 form reentrant walls for a purpose which will presently appear.

A pair of bearings 14 and 15 are formed in the leg 12 to rotatably receive a spindle 16 on a turntable 17 which rotatably supports a mixing bowl 18.

The power unit 10 includes a motor and gear housing 20 mounted on a base 21 having a lower plane face and a handle 22 for moving the power unit 10 from place to place. The motor within the housing 20 is supplied with electricity by conductor cord 23 as shown.

Figure 2:
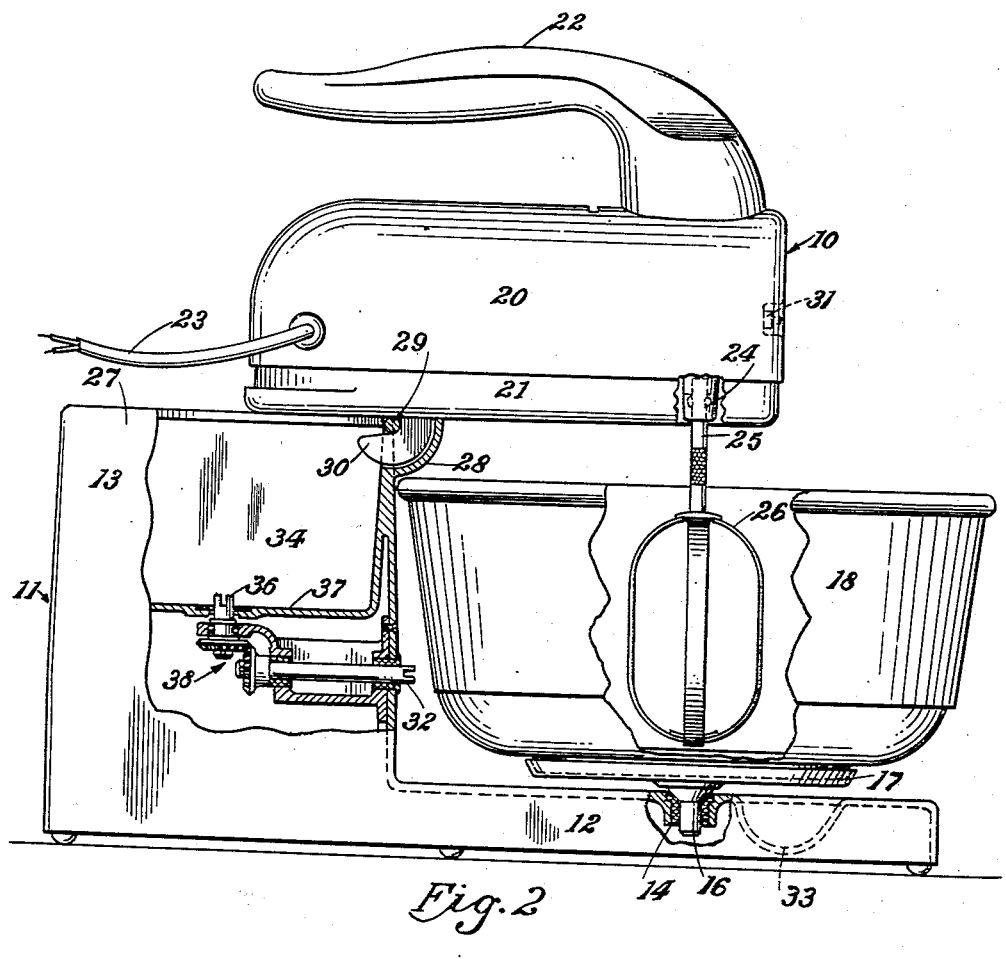
Figure 2 is a vertical plan view of the present invention partly broken away and showing the parts in their normal position of use.

The shaft of the motor (not shown) within the housing 20 is geared to a pair of power shafts, one of which is indicated generally in Figure 2 by the reference numeral 24, the details being shown in Figs. 3 and 4. The power shafts 24 drivingly and detachably receive the stems 25 of a pair of duplicate mixers 26.

The top 27 of the standard 13 is flat to form a support for the base 21 of the power unit 10. A forward protuberance 28 and a cross pin 29 forms an anchorage for a hook 30 extending downwardly from the base 21 to support the power unit 10 in its normal operating position with the power unit 10 overhanging the leg or table 12 and with the beaters 26 extending downwardly into the bowl 18 in the position shown in Fig. 2.

When the spindle 16 is in the bearing 14, the beaters 26 extend downwardly into the bowl 18 centrally thereof, in which position the bowl may be rotated by hand to facilitate the mixing operation. When the spindle 16 is positioned in the bearing 15 the mixers 26 are positioned adjacent one side of the bowl so that the reaction of the material being mixed between the mixer 26 and the side walls of the bowl 18 will cause the latter to rotate automatically.

The power unit 10 is also provided with a power takeoff shaft 31 which may be directly connected to the motor shaft and used to drive various auxiliary attachments or to coact with a complementary driven shaft 32 extending through the wall of the standard 13. The power unit 10 may be removed from the position shown in Fig. 2 and placed in the position shown in Fig. 3. The leg 12 is formed with a depression 33 for receiving the hook 30 extending downwardly from the base 21 of the power unit. The coaction between the hook 30 and the depression 33 serves to hold the shafts 31 and 32 in operative engagement.

The standard 13 below its upper flat face 27 is formed with a receptacle 34 the rear wall of which is cut away to form a slot 35 for a purpose which will presently appear. A driven power shaft 36 extends upwardly through the bottom wall 37 of receptacle 34. The power takeoff shaft 36 is connected by gearing 38 to the driven shaft 32 as shown.

The receptacle 34 is shaped to receive auxiliary utensils such as a blender 40 as shown in Fig. 3, a fruit juicer 41 as shown in Fig. 4 or any other suitable utensil.

Referring to Fig. 3, the blender 40 has a driven shaft 42, extending upwardly through its base 43 directly connected to a blender mixer 44. The shaft 42 is rotatably mounted in the base 43 by a suitable bearing sealed from the interior of the blender 40 in any suitable manner well known to the art. The ends of the shafts 36 and 42 are properly shaped as shown to form a detachable driving connection between them.

The fruit juicer 41, shown in Fig. 4, may also be used with the modification of Figs. 1 to 3, inclusive. It includes a bowl 50 having a spout 51 extending rearwardly through the opening 35 in the rear wall of the receptacle 34. The juicer 41 includes a reamer 52 rotatably mounted in the bottom of the bowl 50 and connected by a reduction gearing 53 to a driven shaft 54 which may be detachably and drivingly connected to the power takeoff shaft 36 of Fig. 3, or the power takeoff shaft 36' of Fig. 4.

The modification of Fig. 4 is similar to that of Figs. 1 to 3, inclusive, except for the driving connection between the power unit 10 and the auxiliary utensils. Where the parts are the same they have been given the same reference numerals. Only the modified construction will be described.

The base 12 is provided with an upwardly extending driven shaft 60 which may be detachably and drivingly connected to one of the power takeoff shafts 24 which normally drives one of the mixers 36. The driven shaft 60 is connected to a power takeoff shaft 36' extending upwardly through the bottom wall 37' of the receptacle 34' by belt and pulley gearing 61 as shown. The power takeoff shaft 36' will coact with the driven shaft 54 of the fruit juicer 41 as shown in Fig. 4 or with the driven shaft 42 of the blender 40 of Fig. 3.

In the modification of Fig. 4 it is unnecessary to provide the auxiliary power takeoff shaft 31 of Figs. 1 to 3, inclusive, unless it is desired to drive other auxiliary devices such as knife sharpeners, can openers, flour sifters, food grinders, etc.

A speed control lever 70 of any well known construction, is provided for controlling the speed of rotation of the various utensils.

Operation

The power unit 10 with the mixers 26 attached may be used independently of the remainder of the device. For example, it may be carried to the stove and used to mix foods while they are being heated or used for other auxiliary mixing purposes.

When it is desired to use the device for ordinary mixing purposes, the parts are positioned in the position shown in Fig. 2 and the power unit 10 energized. With the spindle 16 of the turntable 17 positioned in the bearing 14 the mixers 26 will be positioned substantially centrally of the bowl 18 and it may be necessary to rotate it by hand to get the best mixing action. If it is desired to have the bowl 18 rotate automatically, the spindle 16 is moved to the bearing 15 and the mixers 26 will be positioned adjacent the edge of the bowl 18 whereby the reaction of the material being mixed will cause the bowl to rotate. The speed control 70 is, of course, adjusted to the proper position to rotate the mixers 26 at the proper speed for the particular material being mixed.

With the power unit supported in the position shown in Fig. 2, the mixers 26 may be removed from the power unit 10 and the bowl 18 and turntable 17 removed from the horizontal table or leg 12 and the power takeoff shaft 31 used for other purposes if desired.

When it is desired to use the blender 40 or the juicer 41, the power unit 10 is removed from the supporting standard 13 and placed on the supporting table or leg 12, taking care to engage the power shaft 31 with the shaft 32 in the modification of Figs. 1 to 3, inclusive, or to engage one of the power shafts 24 with the shaft 60 in the modification of Fig. 4. In both instances the hook 30 will rest in the recess 33, it being noted that in the modification of Figs. 1 to 3, inclusive, those elements hold the shafts 31 and 32 in driving engagement.

The blender 40 or the juicer 41 may then be inserted in the receptacle 34 or 34' taking care that the shaft 42 or 54 as the case may be is properly engaged with the shaft 36 or 36'. The power unit 10 is then energized and the utensils used in the usual way.

It is to be noted that in the modification of Figs. 1 to 3 inclusive, the gearing 38 between the shafts 32 and 36 is close to a 1 to 1 ratio while in the modification of Fig. 4 the speed ratio between the shafts 60 and 36' is increased considerably. That is because the power shaft 31 is driven at a much faster rate than the power shafts 24.

When it is desired to store the device, the mixers 26, bowl 18, turntable 17, blender 40 and juicer 41 are removed and stored separately. The power unit is then placed in the position shown in Figures 3 or 4 thus reducing the total height of the device to the height of the pedestal 13 whereby the device may be stored in a space having a very narrow height.

While we have shown but two modifications of our invention it is to be understood that those modifications are to be taken as illustrative only and not in a limiting sense. We do not wish to be limited to the specific structure shown and described but to include all equivalent variations thereof except as limited by the scope of the claims.

We claim:

1. In a food mixer, a base having a lower face upon which it may be supported, a pedestal extending upwardly from the rear end of said base, said base being formed with a plane upper supporting surface forwardly of said pedestal, a portable power unit having a lower plane surface to be supported on said supporting surface of said base, a first power takeoff shaft in one end of said power unit adjacent said lower plane surface, a first coupling shaft formed in the forward wall of said pedestal for detachable coaction with said power takeoff shaft, a receptacle formed in the upper end of said pedestal shaped to receive a power driven utensil, a second power takeoff shaft extending upwardly through the bottom wall of said receptacle for detachable coaction with a coupling shaft formed in the bottom of said utensil and power transmitting means connected between said first coupling shaft and said second power takeoff shaft.

2. In a food mixer according to claim 1 in which a slot is formed in the rear wall of said receptacle to receive a projecting part of said utensil.

3. In a food mixer according to claim 1 including means extending downwardly from the lower flat surface of said power unit for coaction with a recess formed in the upper supporting surface of said base for holding said first power takeoff in driving engagement with said first coupling shaft.

4. In a food mixer according to claim 1 including attaching means extending downwardly from the lower flat surface of said power unit and means formed on the upper end of said pedestal for detachable engagement with said attaching means for supporting said power unit on the top of said pedestal.

5. In a food mixer, a supporting base having a lower surface upon which it may be supported, a receptacle formed in the rear end of said supporting base shaped to receive a power driven utensil, an upwardly facing plane supporting surface formed on the forward portion of said supporting base, a portable power unit having a lower plane surface for engagement with the upwardly facing supporting surface of said base, a first power takeoff shaft on said power unit, a second power takeoff shaft extending upwardly through the lower wall of said receptacle for detachable driving connection with a first power shaft in the bottom of said utensil, a second power shaft on said base positioned for detachable driving connection with said first power takeoff shaft, power transmitting means connected between said second power coupling and said second power takeoff shaft and attaching means formed on the upper end of the foreward wall of said receptacle for detachable co-action with complementary attaching means extending downwardly from the lower surface of said power unit for detachably supporting said power unit on said receptacle.

6. In a food mixer, an L-shaped supporting base adapted to be supported on a horizontal surface and having vertical and horizontal legs forming a reentrant angle between them, said vertical leg forming a supporting standard and having a planar upwardly facing surface, said horizontal leg being formed with an upwardly facing planar supporting surface, a portable power unit having a downwardly facing planar supporting surface adapted to rest upon the upwardly facing planar supporting surfaces of said vertical and horizontal legs and being provided with a supporting lug extending downwardly from the downwardly facing planar supporting surface thereof, means on the upper end of said vertical leg coacting with said downwardly extending lug for detachably supporting said power unit on the planar upwardly facing surface of said vertical leg with said power unit overhanging said horizontal leg, a pair of rotary downwardly facing power take-off shafts on said power unit accessible through openings in the downwardly facing planar supporting surface thereof for detachable connection with a pair of mixers adapted to extend downwardly into a mixing bowl supported on said horizontal leg, the arrangement being such that said power unit may be supported on the upwardly facing planar surfaces of said vertical and horizontal legs.

7. In a food mixer according to claim 6 in which the upwardly facing surface of said horizontal leg is provided with a positioning recess adapted to receive the downwardly extending supporting lug of said power unit to position said power unit upon the upwardly facing surface of said horizontal leg.

8. In a food mixer, a base having a lower surface upon which it may be supported, a pedestal extending upwardly from the rear end of said base, said base being formed with a flat upper supporting surface forwardly of said pedestal, a portable power unit having a lower plane surface to be supported on the upper supporting surface of said base, a first power takeoff shaft in the lower flat surface of said power unit near one end thereof, the first coupling shaft extending through the upper supporting surface of said base adjacent said pedestal, a receptacle in the upper end of said pedestal shaped to receive a power driven utensil, a second power takeoff shaft extending upwardly through the bottom wall of said receptacle for detachable driving connection with a second coupling shaft formed in the bottom of said utensil and power transmitting means drivingly connected between said first coupling shaft and said second power takeoff shaft, attaching means on the top forward edge of said pedestal coacting with complementary attaching means extending downwardly from the lower surface of said power unit for detachably supporting said power unit on said pedestal with said first power takeoff shaft extending downwardly above the upper supporting surface of said base.

References Cited in the file of this patent

UNITED STATES PATENTS

| Number | Name | Date |
| --- | --- | --- |
| 1,823,314 | Brewer | Sept. 15, 1931 |
| 1,862,181 | Emmons | June 7, 1932 |
| 2,109,501 | Osius | Mar. 1, 1938 |
| 2,226,372 | Cravaritis | Dec. 24, 1940 |
| 2,438,465 | Strauss et al. | Mar. 23, 1948 |
| 2,538,877 | McCloy | Jan. 23, 1951 |